(12) United States Patent
San et al.

(10) Patent No.: US 11,122,291 B2
(45) Date of Patent: Sep. 14, 2021

(54) APPARATUS AND METHOD FOR MOTION ESTIMATION OF ISOLATED OBJECTS

(71) Applicant: Realtek Semiconductor Corp., HsinChu (TW)

(72) Inventors: Guangyu San, Suzhou (CN); Yanting Wang, Quzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/792,897

(22) Filed: Feb. 18, 2020

(65) Prior Publication Data
US 2021/0076065 A1   Mar. 11, 2021

(30) Foreign Application Priority Data
Sep. 11, 2019  (TW) ................................. 108132790

(51) Int. Cl.
*H04N 19/56* (2014.01)
*H04N 19/513* (2014.01)
(Continued)

(52) U.S. Cl.
CPC ............. *H04N 19/56* (2014.11); *G06T 7/215* (2017.01); *G06T 7/254* (2017.01); *H04N 19/176* (2014.11); *H04N 19/513* (2014.11); *H04N 19/57* (2014.11)

(58) Field of Classification Search
None
See application file for complete search history.

(56) References Cited

U.S. PATENT DOCUMENTS

| 6,023,300 | A | * | 2/2000 | Han | G06T 9/20 |
| | | | | | 375/240.16 |
| 6,025,879 | A | * | 2/2000 | Yoneyama | H04N 5/145 |
| | | | | | 348/699 |

(Continued)

FOREIGN PATENT DOCUMENTS

| TW | 201026081 | | 7/2010 |
| TW | 201120807 | A1 | 6/2011 |
| TW | 201633187 | A | 9/2016 |

OTHER PUBLICATIONS

Jong-Nam Kim, Tae-Sun Choi, "A Fast Full-Search Motion-Estimation Algorithm Using Representative Pixels and Adaptive Matching Scan", Oct. 2000, IEEE, USA.

(Continued)

*Primary Examiner* — Stefan Gadomski
(74) *Attorney, Agent, or Firm* — Winston Hsu

(57) ABSTRACT

An apparatus and a method for motion estimation of isolated objects are provided. The apparatus includes a dividing circuit, a flag circuit, an analyzing circuit, a calculating circuit and a determination circuit. The dividing circuit divides each of a first image and a second image into a plurality of blocks. The flag circuit adds a flag to each block within the blocks having image information different from background information. The analyzing circuit analyzes continuity of the flag to find a target isolated object having a size less than or equal to a predetermined size. The calculating circuit obtains an initial motion vector of the target isolated object according to locations of the target isolated object in the first image and the second image. The determination circuit determines whether the initial motion vector is correct according to a sum of absolute differences corresponding to the initial motion vector.

10 Claims, 3 Drawing Sheets

(51) Int. Cl.
*H04N 19/57* (2014.01)
*H04N 19/176* (2014.01)
*G06T 7/254* (2017.01)
*G06T 7/215* (2017.01)

(56) References Cited

U.S. PATENT DOCUMENTS

| | | | | |
|---|---|---|---|---|
| 6,125,142 A * | 9/2000 | Han | .................... | H04N 19/563 375/240.1 |
| 6,766,059 B1 * | 7/2004 | Kondo | ................ | H04N 19/105 375/240.14 |
| 10,078,902 B1 * | 9/2018 | Cao | ....................... | B64D 47/08 |
| 2002/0003545 A1 * | 1/2002 | Nakamura | ............ | H04N 19/23 345/640 |
| 2004/0042672 A1 * | 3/2004 | Nozu | ....................... | G06T 9/00 382/233 |
| 2004/0052425 A1 * | 3/2004 | Kondo | ................... | G06T 5/003 382/254 |
| 2004/0062450 A1 * | 4/2004 | Kondo | ................... | G06T 7/194 382/266 |
| 2006/0126956 A1 * | 6/2006 | Lee | ....................... | H04N 19/20 382/243 |
| 2006/0280248 A1 * | 12/2006 | Kim | ..................... | H04N 19/513 375/240.16 |
| 2008/0080617 A1 * | 4/2008 | Kodama | ............... | H04N 19/61 375/240.16 |
| 2008/0095399 A1 * | 4/2008 | Cui | ....................... | H04N 5/145 382/103 |
| 2008/0175439 A1 * | 7/2008 | Kurata | ................ | H04N 19/537 382/107 |
| 2011/0305385 A1 * | 12/2011 | Kambegawa | .......... | H04N 19/94 382/162 |
| 2012/0134541 A1 * | 5/2012 | Hara | .................. | G06K 9/00261 382/103 |
| 2012/0155707 A1 * | 6/2012 | Kawano | ............. | G06K 9/00342 382/103 |
| 2012/0262738 A1 * | 10/2012 | Tamura | ................ | H04N 1/6058 358/1.9 |
| 2012/0288153 A1 * | 11/2012 | Tojo | ........................ | G06T 7/174 382/103 |
| 2012/0308144 A1 * | 12/2012 | Tokunaga | .............. | H04N 19/53 382/206 |
| 2014/0307955 A1 * | 10/2014 | Liu | .................... | G06K 9/00362 382/154 |
| 2014/0368671 A1 * | 12/2014 | Watanabe | ............. | H04N 5/272 348/207.1 |
| 2019/0073813 A1 * | 3/2019 | Ito | ......................... | G06T 3/4038 |
| 2019/0130580 A1 * | 5/2019 | Chen | ................. | G06K 9/00711 |
| 2020/0007817 A1 * | 1/2020 | Diggins | ................ | H04N 7/013 |
| 2020/0118284 A1 * | 4/2020 | Takamura | ............... | G01S 17/89 |
| 2020/0250832 A1 * | 8/2020 | Li | .......................... | G06T 7/277 |
| 2020/0252532 A1 * | 8/2020 | Shimokawa | ........... | H04N 5/243 |
| 2020/0334832 A1 * | 10/2020 | Den Hollander | ....... | G06T 7/254 |

OTHER PUBLICATIONS

Nguyen Van Thang, Jiwoong Choi, Ju-Hyeon Hong, Jin-Sung Kim, Hyuk-Jae Lee, "Hierarchical Motion Estimation for Small Objects in Frame-Rate Up-Conversion", Oct. 12, 2018, IEEE, USA.

* cited by examiner

APPARATUS AND METHOD FOR MOTION ESTIMATION OF ISOLATED OBJECTS

BACKGROUND OF THE INVENTION

1. Field of the Invention

The present invention is related to motion estimation, and more particularly, to an apparatus and method for motion estimation of isolated objects.

2. Description of the Prior Art

In applications which require frame rate conversion, e.g. low frame rate to high frame rate conversion in video decompression, motion estimation and motion compensation (MEMC) may be utilized to analyze motion behavior of a specific object in a video. In general motion estimation methods, motion estimation of large objects (e.g. objects that cover a large amount of pixel units) obtains more related information than motion estimation of small objects, which is beneficial for converging on the correct motion vector. Related arts provide many methods for motion estimation of small objects such as full-search. These methods need to perform comparison several times, however, requiring lots of hardware resources and increasing related costs.

SUMMARY OF THE INVENTION

An objective of the present invention is to provide an apparatus and method for motion estimation of isolated objects, in order to perform motion estimation of small objects without introducing any side effector in a way that is less likely to introduce side effects.

At least one embodiment of the present invention provides an apparatus for motion estimation of isolated objects. The apparatus comprises a dividing circuit, a flag circuit, an analyzing circuit, a calculating circuit and a determination circuit. The dividing circuit may be configured to divide each of a first image and a second image into a plurality of blocks, wherein the first image and the second image are images of two consecutive frames. The flag circuit is coupled to the dividing circuit, and may be configured to add a flag to each block within the blocks having image information different from background information to find one or more isolated objects. The analyzing circuit is coupled to the flag circuit, and may be configured to analyze continuity of the flag in the first image and the second image to find a target isolated object having a size less than or equal to a predetermined size from the one or more isolated objects. The calculating circuit is coupled to the analyzing circuit, and may be configured to obtain an initial motion vector of the target isolated object according to locations of the target isolated object in the first image and the second image. The determination circuit is coupled to the calculating circuit, and may be configured to determine whether the initial motion vector is correct according to a sum of absolute differences (SAD) corresponding to the initial motion vector.

At least one embodiment of the present invention provides a method for motion estimation of isolated objects. The method comprises: utilizing a dividing circuit to divide each of a first image and a second image into a plurality of blocks, wherein the first image and the second image are images of two consecutive frames; utilizing a flag circuit to add a flag to each block within the blocks having image information different from background information to find one or more isolated objects; utilizing an analyzing circuit to analyze continuity of the flag in the first image and the second image to find a target isolated object having a size less than or equal to a predetermined size from the one or more isolated objects; utilizing a calculating circuit to obtain an initial motion vector of the target isolated object according to locations of the target isolated object in the first image and the second image; and utilizing a determination circuit to determine whether the initial motion vector is correct according to a sum of absolute differences (SAD) corresponding to the initial motion vector.

The apparatus and method of the present invention can make the motion vector of a small object converge correctly. In comparison with the related art, comparison counts or calculation amount (e.g. calculation time) of the method of the present invention can be greatly reduced. Thus, the apparatus or circuit implementing the method does not need a great amount of hardware resources, so overall costs can be effectively reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
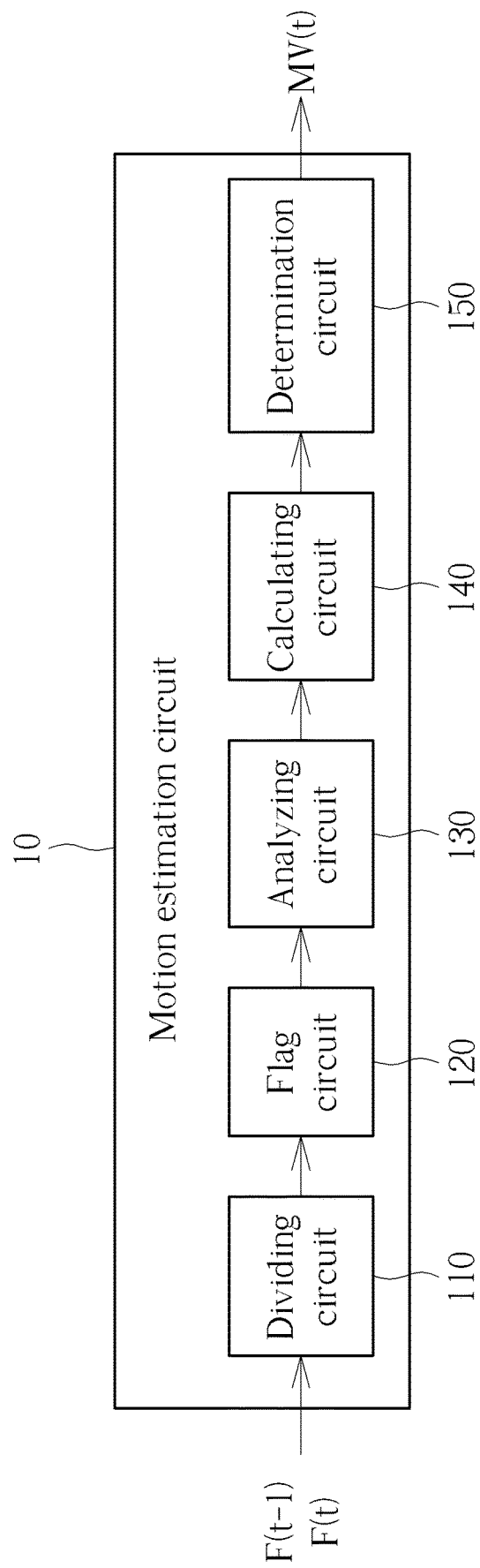
FIG. 1 is a diagram illustrating an apparatus for motion estimation of isolated objects according to an embodiment of the present invention.

FIG. 1 is a diagram illustrating an apparatus for motion estimation of isolated objects such as a motion estimation circuit 10 according to an embodiment of the present invention. As shown in FIG. 1, the motion estimation circuit 10 may comprise a dividing circuit 110, a flag circuit 120, an analyzing circuit 130, a calculating circuit 140 and a determination circuit 150, where the flag circuit 120 is coupled to the dividing circuit 110, the analyzing circuit 130 is coupled to the flag circuit 120, the calculating circuit 140 is coupled to the analyzing circuit 130, and the determination circuit 150 is coupled to the calculating circuit 140. In this embodiment, the motion estimation circuit 10 may receive a plurality of consecutive frames of a video, and perform motion estimation of isolated objects in the video according to any two consecutive frames within the plurality of consecutive frames. In this embodiment, images F(t-1) and F(t) may respectively represent images of a $(t-1)^{th}$ frame and a $(t)^{th}$ frame, and a motion vector MV(t) may represent a motion vector of a target isolated object between the $(t-1)^{th}$ frame and the $(t)^{th}$ frame, where "t" is an integer greater than one.

Figure 2:
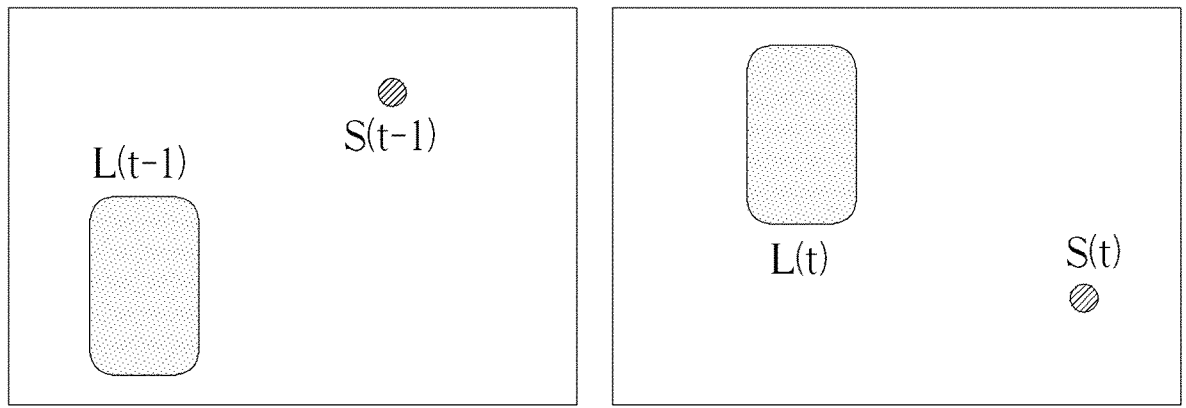
FIG. 2 is a diagram illustrating images of two consecutive frames according to an embodiment of the present invention.

Assume that there are two isolated objects in the video, including a large isolated object such as an object L and a small isolated object such as an object S, where the object L is illustrated by L(t-1) and L(t) in the images F(t-1) and F(t), respectively, and the object S is illustrated by S(t-1) and S(t) in the images F(t-1) and F(t), respectively, as shown in FIG. 2. The dividing circuit 110 may divide each of the images F(t-1) and F(t) into M1×M2 blocks, where each block within the M1×M2 blocks comprises N pixels. In this embodiment, M1 and M2 may be the same or different positive integers, and N may be an integer greater than one.

The flag circuit 120 may add a flag to each block within the M1×M2 blocks having image information different from background information to find one or more isolated objects (e.g. the object L and the object S), where the flag circuit 120 may find the one or more isolated objects via searching for consecutively adjacent flags. For example, in response to color information of the aforementioned each block being different from color information of at least one surrounding region of the aforementioned each block, the flag circuit 120 may add the flag on the aforementioned each block to find the one or more isolated objects. For brevity, assume that the whole region except for the object image L(t-1) and S(t-1) has a single color in the image F(t-1), and the whole region except for the object image L(t) and S(t) has the single color in the image F(t), where the single color may be regarded as the background information, and the region having the single color may be regarded as the aforementioned at least one surrounding region. The flag circuit 120 may calculate an average of the color information (e.g. gray level values) of N pixels within each block within the M1×M2 blocks, to be the image information of the aforementioned each block, but the present invention is not limited thereto. As image information of blocks covered by the object image L(t-1) and S(t-1) is different from the background information, these blocks in the image F(t-1) may be added with the flag, and the flag circuit 120 may take consecutively adjacent flags as a single object to find locations of the object L and the object S in the image F(t-1); deduced by analogy, locations of the object L and the object S in the image F(t) can be found.

It should be noted that the manner of obtaining the background information is not limited to a specific image processing method, and any image processing method capable of identifying a background region within an image can be utilized for defining the background information. For example, an image processor (which may be positioned inside or outside of the motion estimation circuit 10) may analyze color information of all pixels of each of the images F(t-1) and F(t), to find specific color information having an occupation rate greater than a threshold value (or having a maximum occupation rate) in these pixels, and take the specific color information as the background information; in another example, an image processor may search for a region having a large amount of pixels with similar color information, and average the color information in the region to obtain the background information; but the present invention is not limited thereto.

Figure 3:
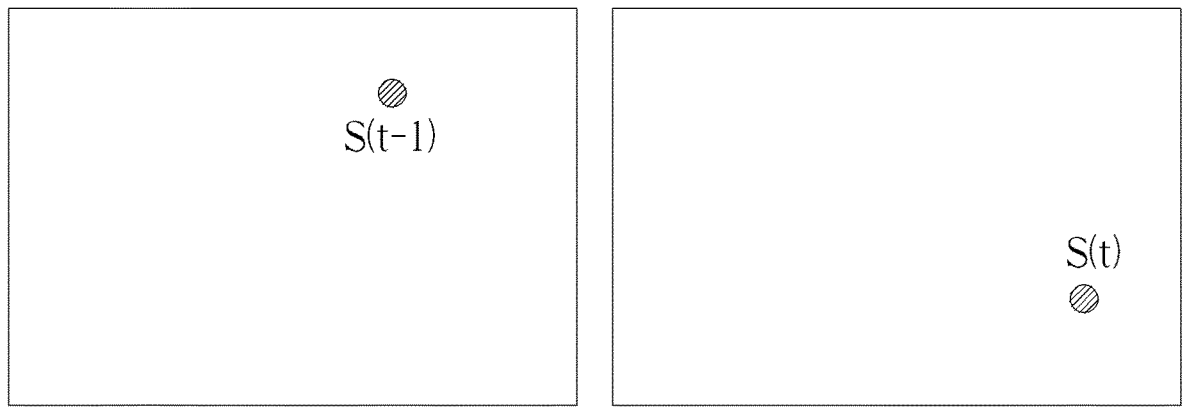
FIG. 3 is a diagram illustrating that large isolated objects within the images shown in FIG. 2 are discarded according to an embodiment of the present invention.

Then, the analyzing circuit 130 may analyze continuity of the flag in the images F(t-1) and F(t) to find a target isolated object having a size less than or equal to a predetermined size from the one or more isolated objects. In some embodiments, if an isolated object (e.g. the object L) is greater than a predetermined size, this isolated object may cover more than a specific number of blocks. A motion vector of a block within the blocks covered by this isolated object is typically associated with a motion vector of a nearby block of this block, where this feature is beneficial for a motion vector of this isolated object to correctly converge in the space dimension. In addition, blocks covered by this isolated object which have the same motion vector between two frames may be overlapped with a large area, so it is easy to obtain a reference block for calculating the motion vector in the time dimension to easily obtain the correct motion vector. Thus, in the related art, it is easy to obtain a motion vector of an isolated object having a size greater than the predetermined size. The motion estimation circuit 10 of the present invention aims to handle an isolated object having a size less than the predetermined size (e.g. the object S). Thus, when a number of flags corresponding to a specific isolated object within the one or more isolated objects is greater than a predetermined number, the analyzing circuit 130 may discard/screen this specific isolated object as shown in FIG. 3, and the object image L(t-1) and L(t) will not undergo subsequent operations.

After being processed by the analyzing circuit 130, only the target isolated object having the size less than the predetermined size (e.g. the object S) remains in the images F(t-1) and F(t), and the locations of the target isolated object in the images F(t-1) and F(t) may be represented by a location of block(s) covered by the object image S(t-1) in the image F(t-1) and a location of block(s) covered by the object image S(t) in the image F(t). More particularly, the location of the target isolated object in the image F(t-1) is represented by a location of a first block corresponding to the target isolated block in the image F(t-1), and the location of the target isolated object in the image F(t) is represented by a location of a second block corresponding to the target isolated block in the image F(t). For example, the object image S(t-1) covers one or more blocks (e.g. 2×2 blocks) in the image F(t-1), and a coordinate (e.g. a coordinate (x0, y0)) of a block positioned on an upper-left corner of the one or more blocks may be utilized to represent the location of the object S in the image F(t-1); deduced by analogy, the object image S(t) covers one or more blocks (e.g. 2×2 blocks) in the image F(t), and a coordinate (e.g. a coordinate (x1, y1)) of a block positioned on an upper-left corner of the one or more blocks may be utilized to represent the location of the object S in the image F(t). Thus, the calculating circuit 140 may obtain an initial motion vector of the object S according to the locations of the object S in the images F(t-1) and F(t), e.g. (x1-x0, y1-y0).

Then, the determination circuit 150 may determine whether an initial motion vector MV0 is correct according to a sum of absolute differences (SAD) corresponding to the initial motion vector MV0, where the SAD may be configured to determine whether object images within the blocks (e.g. a block B0(t-1) of the image F(t-1) and a block B0(t) of the image F(t)) corresponding to the coordinates being utilized for calculating the initial motion vector MV0 match. For example, the determination circuit 150 may calculate a sum of respective absolute values of respective differences between respective gray level values of pixels within the block B0(t-1) corresponding to the coordinate (x0, y0) in the image F(t-1) and respective gray level values of pixels within the block B0(t) corresponding to the coordinate (x1, y1) in the image F(t), to be the SAD, but the present invention is not limited thereto. When the SAD corresponding to the initial motion vector MV0 is greater than a threshold value, it means the object image within the block corresponding to the coordinate (x0, y0) in the image F(t-1) and the object image within the block corresponding to the coordinate (x1, y1) in the image F(t) do not match, and the determination circuit 150 may therefore determine that the initial motion vector MV0 is incorrect. The threshold value may adopt an SAD obtained by utilizing a related art full-search for performing motion estimation and compensation on small objects, but the present invention is not limited thereto.

In an example, assume that the object image S(t-1) merely covers one block such as the block B0(t-1) within the image F(t-1) and the object image S(t) merely covers one block such as the block B0(t) within the image F(t). If the location of the object image S(t-1) in the block B0(t-1) is different from the location of the object image S(t) in the block B0(t), the SAD obtained according to the blocks B0(t-1) and B0(t) may be greater than the threshold value, and the determination circuit 150 may determine that the initial motion vector MV0 is incorrect. This means the initial motion vector MV0 obtained according to the blocks B0(t-1) and B0(t) at this moment is not equal to the motion vector of the object S between the images F(t-1) and F(t). When the determination circuit 150 determines that the initial motion vector MV0 is incorrect, the determination circuit 150 may apply an offset (e.g. an offset applied by unit of pixels) to the location of the block B0(t-1) or the location of the block B0(t) (or apply respective offsets to the location of the block B0(t-1) and the location of the block B0(t)), to obtain a modified motion vector MV1 of the object S, and determine whether the modified motion vector MV1 is correct according to an SAD corresponding to the modified motion vector MV1. For example, before applying the offset, the location of the object image S(t-1) in the block B0(t-1) is different from the location of the object image S(t) in the block B0(t), but after applying the offset, a location of the object image S(t-1) in a modified block B1(t-1) (which is obtained by applying an offset to the block B0(t-1)) and a location of the object image S(t) in a modified block B1(t) (which is obtained by applying an offset to the block B0(t)) can become identical. An SAD corresponding to a modified motion vector MV1 obtained according to a location of the block B1(t-1) in the image F(t-1) and a location of the block B1(t) in the image F(t) can be less than the threshold value at this moment, and the determination circuit 150 may determine that the modified motion vector MV1 is correct, which means that the modified motion vector MV1 obtained according to the blocks B1(t-1) and B1(t) is equal to the motion vector of the object S between the images F(t-1) and F(t).

In another example, assume that the object image S(t-1) covers multiple blocks (e.g. the block B0(t-1), which is a block positioned on the upper-left corner of the multiple blocks covered by the object image S(t-1)) within the image F(t-1), and the object image S(t) covers multiple blocks (e.g. the block B0(t), which is a block positioned on the upper-left corner of the multiple blocks covered by the object image S(t)) within the image F(t), where an edge of the object image S(t-1) is located in the block B0(t-1) and an edge of the object image S(t) is located in the block B0(t). If a location of the edge of the object image S(t-1) in the block B0(t-1) is different from a location of the edge of the object image S(t) in the block B0(t), the determination circuit 150 may apply an offset (e.g. an offset applied by unit of pixels) to the location of the block B0(t-1) or the location of the block B0(t) (or apply respective offsets to the location of the block B0(t-1) and the location of the block B0(t)), to obtain a correct motion vector of the object S between the images F(t-1) and F(t). Repeated descriptions for this embodiment are omitted for brevity.

In yet another example, assume that the object image S(t-1) covers multiple blocks (e.g. the block B0(t-1), which is a block positioned on the upper-left corner of the multiple blocks covered by the object image S(t-1)) within the image F(t-1), and the object image S(t) covers multiple blocks (e.g. the block B0(t), which is a block positioned on the upper-left corner of the multiple blocks covered by the object image S(t)) within the image F(t), where the shape of the object image S(t-1) and the shape of the object image S(t) are not identical (e.g. the object S undergoes deformation during the motion between the images F(t-1) and F(t)), and the motion vector obtained according to the location of the block B0(t-1) in the image F(t-1) and the location of the block B0(t) in the image F(t) cannot correctly represent the motion of the whole object S between the images F(t-1) and F(t) at this time. Under this situation, the determination circuit 150 may apply an offset to select another block (e.g. select another block different from the block B0(t-1) within the multiple blocks covered by the object image S(t-1) in the image F(t-1), or select another block different from the block B0(t) within the multiple blocks covered by the object image S(t) in the image F(t)) for converging on the correct motion vector.

It should be noted that any of the aforementioned manners of converging on the correct motion vector according to the SAD in the above examples are not limited to a specific procedure. The determination circuit 150 may iteratively perform determination of SADs and modification of motion vectors. For example, the determination circuit 150 may determine whether to apply an offset to the location of the block B0(t-1) or the location of the block B0(t) according to whether an SAD corresponding to a currently obtained motion vector (e.g. the initial motion vector MV0) is greater than the threshold value, and determine whether the modified motion vector MV1 is correct according to an SAD corresponding to the modified motion vector MV1. Thus, the determination circuit 150 may iteratively perform the above operations (e.g. applying an offset, calculating a motion vector, calculating an SAD) to gradually converge on the correct motion vector from the initial motion vector, until an SAD corresponding to a specific motion vector is less than the threshold value; or, based on the initial motion vector MV0, the determination circuit 150 may collect multiple candidate motion vectors via allowing variation within a range upon the corresponding location, and calculate SADs respectively corresponding to the multiple motion vectors to select the motion vector corresponding to the minimum SAD to be the final motion vector, but the present invention is not limited thereto.

Figure 4:
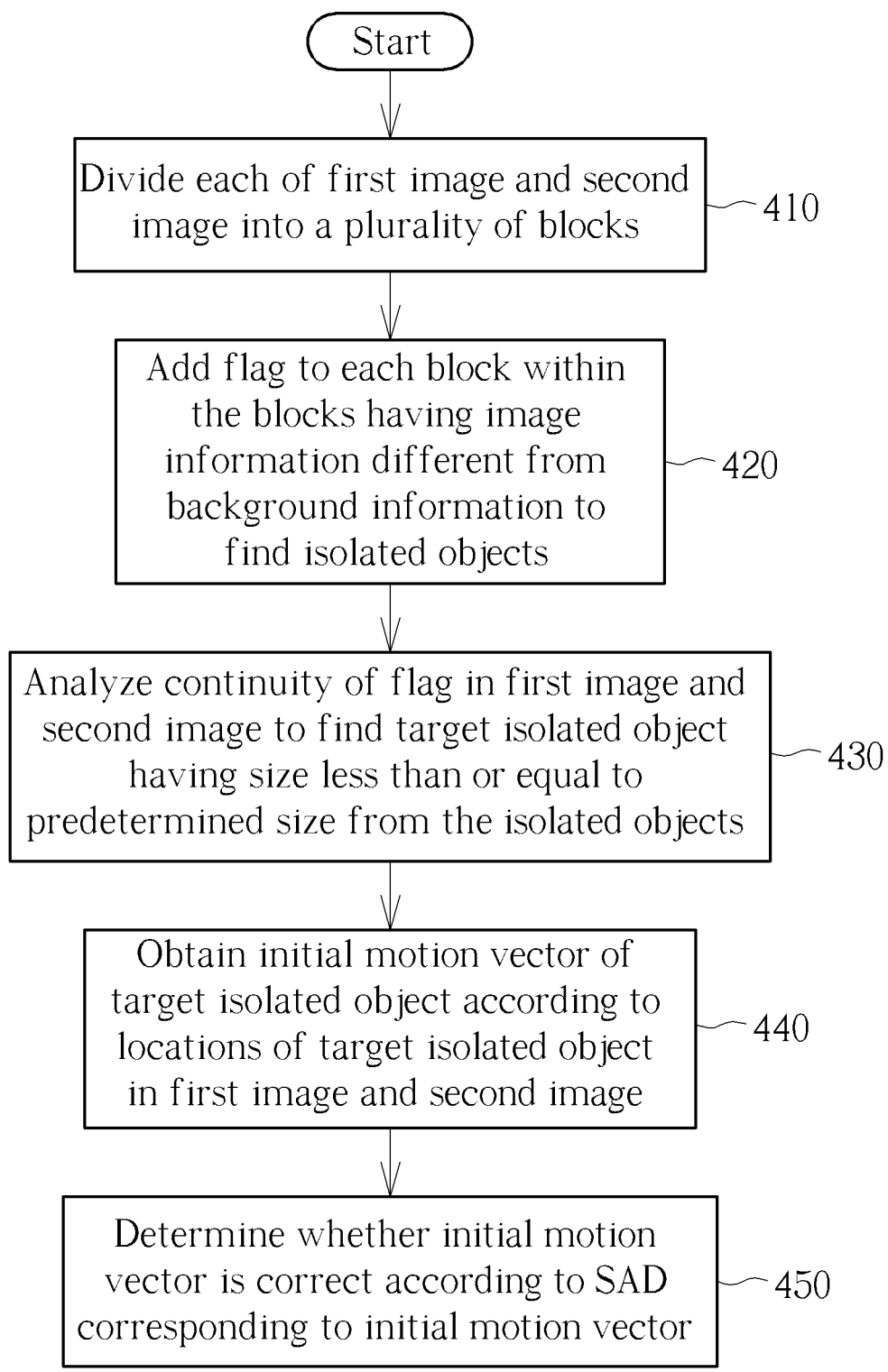
FIG. 4 is a working flow of a method for motion estimation of isolated objects according to an embodiment of the present invention.

FIG. 4 is a working flow of a method for motion estimation of isolated objects according to an embodiment of the present invention. It should be noted that the working flow is for illustrative purposes only, and is not a limitation of the present invention. One or more steps may be added, deleted or modified in the working flow shown in FIG. 4. In addition, these steps do not have to be executed in the order shown in FIG. 4 if the same result is obtained.

In Step 410, the dividing circuit 110 may divide each of a first image and a second image into a plurality of blocks, wherein the first image and the second image are images of two consecutive frames such as the image F(t-1) and F(t) in the aforementioned embodiment.

In Step 420, the flag circuit 120 may add a flag to each block within the blocks having image information different from background information to find one or more isolated objects, such as the object L and the object S in the aforementioned embodiment.

In Step 430, the analyzing circuit 130 may analyze continuity of the flag in the first image and the second image to find a target isolated object having a size less than or equal to a predetermined size from the one or more isolated objects, e.g. to select the object S having the size less than or equal to the predetermined size from the object L and the object S.

In Step 440, the calculating circuit 140 may obtain an initial motion vector of the target isolated object according to locations of the target isolated object in the first image and the second image.

In Step 450, the determination circuit 150 may determine whether the initial motion vector is correct according to an SAD corresponding to the initial motion vector.

To summarize, the present invention provides an apparatus and method for motion estimation of isolated objects, and more particularly, small isolated objects such as the object S in the aforementioned embodiment. In comparison with utilizing a full-search upon small isolated objects for motion estimation as in the related art, the required comparison count or calculation amount of the present invention can be greatly reduced, thereby effectively reducing overall costs. In addition, the present invention can perform fine tuning by unit of pixels based on an initial motion vector, which guarantees the correctness of the motion vector. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for motion estimation of isolated objects, comprising:
   a dividing circuit, configured to divide each of a first image and a second image into a plurality of blocks, wherein the first image and the second image are images of two consecutive frames;
   a flag circuit, coupled to the dividing circuit, configured to add a flag to each block within the blocks having image information different from background information to find one or more isolated objects via searching for consecutively adjacent flags;
   an analyzing circuit, coupled to the flag circuit, configured to analyze continuity of the flag in the first image and the second image to find a target isolated object having a size less than or equal to a predetermined size from the one or more isolated objects, wherein when a number of consecutively adjacent flags corresponding to a specific isolated object within the one or more isolated objects is greater than a predetermined number, the analyzing circuit discards the specific isolated object;
   a calculating circuit, coupled to the analyzing circuit, configured to obtain an initial motion vector of the target isolated object according to locations of the target isolated object in the first image and the second image; and
   a determination circuit, coupled to the calculating circuit, configured to determine whether the initial motion vector is correct according to a sum of absolute differences (SAD) corresponding to the initial motion vector.

2. The apparatus of claim 1, wherein in response to color information of said each block being different from color information of at least one surrounding region of said each block, the flag circuit adds the flag to said each block.

3. The apparatus of claim 1, wherein when the SAD corresponding to the initial motion vector is greater than a threshold value, the initial motion vector is incorrect.

4. The apparatus of claim 1, wherein the location of the target isolated object in the first image is represented by a first block corresponding to the target isolated object in the first image, and the location of the target isolated object in the second image is represented by a second block corresponding to the target isolated object in the second image.

5. The apparatus of claim 4, wherein when the determination circuit determines the initial motion vector is incorrect, the determination circuit applies an offset to the location of the first block or the location of the second block to obtain a modified motion vector of the target isolated object, and determines whether the modified motion vector is correct according to an SAD corresponding to the modified motion vector.

6. A method for motion estimation of isolated objects, comprising:
   utilizing a dividing circuit to divide each of a first image and a second image into a plurality of blocks, wherein the first image and the second image are images of two consecutive frames;
   utilizing a flag circuit to add a flag to each block within the blocks having image information different from background information to find one or more isolated objects via searching for consecutively adjacent flags;
   utilizing an analyzing circuit to analyze continuity of the flag in the first image and the second image to find a target isolated object having a size less than or equal to a predetermined size from the one or more isolated objects, and when a number of consecutively adjacent flags corresponding to a specific isolated object within the one or more isolated objects is greater than a predetermined number, utilizing the analyzing circuit to discard the specific isolated object;
   utilizing a calculating circuit to obtain an initial motion vector of the target isolated object according to locations of the target isolated object in the first image and the second image; and
   utilizing a determination circuit to determine whether the initial motion vector is correct according to a sum of absolute differences (SAD) corresponding to the initial motion vector.

7. The method of claim 6, wherein the step of utilizing the flag circuit to add the flag to said each block within the blocks having image information different from background information to find the one or more isolated objects comprises:
   in response to color information of said each block being different from color information of at least one surrounding region of said each block, utilizing the flag circuit to add the flag to said each block.

8. The method of claim 6, wherein when the SAD corresponding to the initial motion vector is greater than a threshold value, the initial motion vector is incorrect.

9. The method of claim 6, wherein the location of the target isolated object in the first image is represented by a first block corresponding to the target isolated object in the first image, and the location of the target isolated object in the second image is represented by a second block corresponding to the target isolated object in the second image.

10. The method of claim 9, further comprising:
   when the determination circuit determines the initial motion vector is incorrect, utilizing the determination circuit to apply an offset to the location of the first block or the location of the second block to obtain a modified motion vector of the target isolated object, and determining whether the modified motion vector is correct according to an SAD corresponding to the modified motion vector.

* * * * *